United States Patent
Goel

(10) Patent No.: US 10,430,853 B2
(45) Date of Patent: Oct. 1, 2019

(54) MULTIPLE FORMAT SEARCH RESULT SETS

(71) Applicant: eBay Inc., San Jose, CA (US)

(72) Inventor: Amit Goel, Cupertino, CA (US)

(73) Assignee: eBay Inc., San Jose, CA (US)

( * ) Notice: Subject to any disclaimer, the term of this patent is extended or adjusted under 35 U.S.C. 154(b) by 251 days.

(21) Appl. No.: 15/582,140

(22) Filed: Apr. 28, 2017

(65) Prior Publication Data

US 2017/0236178 A1 Aug. 17, 2017

Related U.S. Application Data

(63) Continuation of application No. 11/021,788, filed on Dec. 23, 2004, now abandoned.

(51) Int. Cl.
| | |
|---|---|
| *G06Q 30/00* | (2012.01) |
| *G06Q 30/06* | (2012.01) |
| *G06Q 30/08* | (2012.01) |
| *G06Q 40/04* | (2012.01) |

(52) U.S. Cl.
CPC ..... *G06Q 30/0625* (2013.01); *G06Q 30/0601* (2013.01); *G06Q 30/08* (2013.01); *G06Q 40/04* (2013.01)

(58) Field of Classification Search
CPC .......... G06Q 30/0601; G06Q 30/0641; G06Q 30/0625; G06Q 30/08
USPC ............................. 705/26.1, 26.62, 26.3, 27.1
See application file for complete search history.

(56) References Cited

U.S. PATENT DOCUMENTS

| | | |
|---|---|---|
| 5,459,306 A | 10/1995 | Stein et al. |
| 5,774,868 A | 6/1998 | Cragun et al. |
| 5,857,175 A | 1/1999 | Day et al. |
| 5,862,325 A | 1/1999 | Reed et al. |
| 5,999,914 A | 12/1999 | Blinn et al. |
| 6,041,311 A | 3/2000 | Chislenko et al. |
| 6,073,112 A | 6/2000 | Geerlings |
| 6,078,892 A | 6/2000 | Anderson et al. |
| 6,092,049 A | 7/2000 | Chislenko et al. |
| 6,134,532 A | 10/2000 | Lazarus et al. |
| 6,412,012 B1 | 6/2002 | Bieganski et al. |
| 6,963,850 B1 | 11/2005 | Bezos et al. |
| 6,963,867 B2 | 11/2005 | Ford et al. |
| 7,013,289 B2 | 3/2006 | Horn et al. |
| 7,072,858 B1 | 7/2006 | Litzow et al. |
| 7,080,030 B2 | 7/2006 | Eglen et al. |

(Continued)

FOREIGN PATENT DOCUMENTS

JP  2001319099 A  *  11/2001

OTHER PUBLICATIONS

"U.S. Appl. No. 11/021,788 Examiner Interview Summary dated Dec. 5, 2016", 6 pgs.

(Continued)

*Primary Examiner* — Yogesh C Garg
(74) *Attorney, Agent, or Firm* — Schwegman Lundberg & Woessner

(57) ABSTRACT

A search application can return results including item listings posted to a website. An item listing can be posted to the website in a first format for a first time period and posted to the website in a second format for a second period of time. Responsive to a query for an item, results can be displayed in both the first format and the second format in a user interface.

20 Claims, 6 Drawing Sheets

(56) References Cited

U.S. PATENT DOCUMENTS

| | | |
|---|---|---|
| 7,082,407 B1 | 7/2006 | Bezos et al. |
| 7,089,237 B2 | 8/2006 | Turnbull et al. |
| 7,103,565 B1 | 9/2006 | Vaid |
| 7,113,917 B2 | 9/2006 | Jacobi et al. |
| 7,127,613 B2 | 10/2006 | Pabla et al. |
| 7,203,753 B2 | 4/2007 | Yeager et al. |
| 7,213,047 B2 | 5/2007 | Yeager et al. |
| 7,222,187 B2 | 5/2007 | Yeager et al. |
| 7,228,287 B1 | 6/2007 | Samson et al. |
| 7,251,625 B2 | 7/2007 | Anglum |
| 7,254,608 B2 | 8/2007 | Yeager et al. |
| 7,324,953 B1 | 1/2008 | Murphy |
| 7,392,222 B1 | 6/2008 | Hamilton et al. |
| 7,447,646 B1 | 11/2008 | Agarwal et al. |
| 7,457,769 B2 | 11/2008 | Goren |
| 7,467,106 B1 | 12/2008 | Levine et al. |
| 7,472,076 B2 * | 12/2008 | Garg .................. G06Q 30/02 |
| | | 705/26.3 |
| 7,481,367 B2 | 1/2009 | Fees et al. |
| 7,496,543 B1 | 2/2009 | Bamford et al. |
| 7,542,951 B1 | 6/2009 | Chakrabarti |
| 7,552,069 B2 | 6/2009 | Kepecs |
| 7,571,121 B2 | 8/2009 | Bezos et al. |
| 7,584,159 B1 | 9/2009 | Chakrabarti et al. |
| 7,584,192 B2 | 9/2009 | Rey et al. |
| 7,599,860 B2 | 10/2009 | Bird et al. |
| 7,603,300 B2 | 10/2009 | Haffner et al. |
| 7,644,034 B2 | 1/2010 | Evelyn et al. |
| 7,647,269 B2 * | 1/2010 | Brett .................. G06Q 10/02 |
| | | 705/37 |
| 7,685,074 B2 | 3/2010 | Linden et al. |
| 7,689,454 B2 | 3/2010 | Ramsey et al. |
| 7,698,169 B2 | 4/2010 | Raccah et al. |
| 7,739,203 B2 | 6/2010 | Kettner et al. |
| 7,769,625 B2 | 8/2010 | Veit |
| 7,822,692 B2 | 10/2010 | Zuerl et al. |
| 7,860,776 B1 | 12/2010 | Chin et al. |
| 7,881,957 B1 | 2/2011 | Cohen et al. |
| 7,883,002 B2 | 2/2011 | Jin et al. |
| 8,160,928 B2 | 4/2012 | Gentry VonBergen et al. |
| 8,160,933 B2 | 4/2012 | Nguyen et al. |
| 8,533,058 B1 | 9/2013 | Agarwal et al. |
| 2001/0007981 A1 | 7/2001 | Woolston |
| 2001/0034694 A1 | 10/2001 | Elias |
| 2001/0047308 A1 | 11/2001 | Kaminsky et al. |
| 2002/0038281 A1 | 3/2002 | Lohmann et al. |
| 2002/0065757 A1 | 5/2002 | Lam |
| 2002/0065761 A1 | 5/2002 | Fischer et al. |
| 2002/0072966 A1 | 6/2002 | Eldering et al. |
| 2002/0082881 A1 | 6/2002 | Price et al. |
| 2002/0099605 A1 | 7/2002 | Weitzman et al. |
| 2002/0107777 A1 | 8/2002 | Lane et al. |
| 2002/0138349 A1 | 9/2002 | Platt et al. |
| 2002/0188527 A1 | 12/2002 | Dillard et al. |
| 2002/0188551 A1 | 12/2002 | Grove et al. |
| 2003/0135442 A1 | 7/2003 | Kumar et al. |
| 2003/0191653 A1 | 10/2003 | Birnbaum et al. |
| 2003/0195877 A1 | 10/2003 | Ford et al. |
| 2003/0200156 A1 | 10/2003 | Roseman et al. |
| 2003/0229545 A1 | 12/2003 | Veres et al. |
| 2004/0034562 A1 | 2/2004 | Shuto et al. |
| 2004/0034570 A1 | 2/2004 | Davis |
| 2004/0054615 A1 | 3/2004 | Lin |
| 2004/0128224 A1 | 7/2004 | Dabney et al. |
| 2004/0181461 A1 * | 9/2004 | Raiyani .................. G06Q 30/02 |
| | | 705/14.64 |
| 2004/0215527 A1 | 10/2004 | Grove et al. |
| 2005/0004978 A1 | 1/2005 | Reed et al. |
| 2005/0004984 A1 | 1/2005 | Simpson |
| 2005/0033648 A1 | 2/2005 | Jin et al. |
| 2005/0033683 A1 | 2/2005 | Sacco et al. |
| 2005/0102189 A1 | 5/2005 | Lopez et al. |
| 2005/0125308 A1 | 6/2005 | Puentes et al. |
| 2005/0165670 A1 | 7/2005 | Woodmansey et al. |
| 2005/0187818 A1 | 8/2005 | Zito et al. |
| 2005/0187859 A1 | 8/2005 | Growney et al. |
| 2005/0194439 A1 | 9/2005 | Zuerl et al. |
| 2005/0197901 A1 | 9/2005 | Veit et al. |
| 2005/0197946 A1 * | 9/2005 | Williams .......... G06Q 10/06393 |
| | | 705/36 R |
| 2005/0240507 A1 | 10/2005 | Galen et al. |
| 2005/0283406 A1 | 12/2005 | Kuelbs et al. |
| 2005/0289140 A1 | 12/2005 | Ford et al. |
| 2006/0143109 A1 | 6/2006 | Goel |
| 2006/0167756 A1 | 7/2006 | VonBergen et al. |
| 2006/0173974 A1 | 8/2006 | Tang |
| 2006/0195428 A1 | 8/2006 | Peckover |
| 2006/0277145 A1 | 12/2006 | Raccah et al. |
| 2007/0073580 A1 | 3/2007 | Perry et al. |
| 2007/0073593 A1 | 3/2007 | Perry et al. |
| 2007/0250403 A1 | 10/2007 | Altschuler |
| 2007/0271153 A1 | 11/2007 | Goel et al. |
| 2008/0010148 A1 | 1/2008 | Knibiehly et al. |
| 2008/0059283 A1 | 3/2008 | Hansen et al. |
| 2008/0086346 A1 | 4/2008 | Kossack |
| 2008/0154625 A1 | 6/2008 | Serbanescu |
| 2009/0150258 A1 | 6/2009 | Nokes et al. |
| 2009/0171680 A1 | 7/2009 | Wiesinger |
| 2009/0281877 A1 | 11/2009 | Bezos et al. |
| 2010/0198702 A1 | 8/2010 | Raccah et al. |
| 2018/0204277 A1 * | 7/2018 | Gard .................. G06Q 30/02 |

OTHER PUBLICATIONS

"U.S. Appl. No. 11/021,788 Examiner Interview Summary dated Dec. 21, 2016", 7 pgs.

"U.S. Appl. No. 11/021,788, Advisory Action dated Jul. 11, 2008", 3 pgs.

"U.S. Appl. No. 11/021,788, Advisory Action dated Aug. 27, 2009", 2 pgs.

"U.S. Appl. No. 11/021,788, Appeal Brief filed Sep. 25, 2008", 16 pgs.

"U.S. Appl. No. 11/021,788, Appeal Brief dated May 26, 2009", 19 pgs.

"U.S. Appl. No. 11/021,788, Appeal Decision dated Apr. 27, 2011", 11 pgs.

"U.S. Appl. No. 11/021,788, Decision on Pre-Appeal Brief Request dated Aug. 14, 2014", 2 pgs.

"U.S. Appl. No. 11/021,788, Decision on Pre-Appeal Brief Request dated Aug. 25, 2008", 2 pgs.

"U.S. Appl. No. 11/021,788, Examiner Interview Summary dated Jan. 25, 2016", 4 pgs.

"U.S. Appl. No. 11/021,788, Examiner Interview Summary dated Mar. 11, 2009", 2 pgs.

"U.S. Appl. No. 11/021,788, Examiner Interview Summary dated Apr. 14, 2015", 3 pgs.

"U.S. Appl. No. 11/021,788, Examiner Interview Summary dated Aug. 19, 2015", 4 pgs.

"U.S. Appl. No. 11/021,788, Examiner Interview Summary dated Oct. 14, 2014", 4 pgs.

"U.S. Appl. No. 11/021,788, Examiner's Answer to Appeal Brief dated Jan. 26, 2010", 14 pgs.

"U.S. Appl. No. 11/021,788, Final Office Action dated Apr. 15, 2014", 13 pgs.

"U.S. Appl. No. 11/021,788, Final Office Action dated Apr. 18, 2008", 8 pgs.

"U.S. Appl. No. 11/021,788, Final Office Action dated Sep. 28, 2016", 12 pgs.

"U.S. Appl. No. 11/021,788, Final Office Action dated Oct. 15, 2015", 17 pgs.

"U.S. Appl. No. 11/021,788, Final Office Action dated Dec. 29, 2014", 14 pgs.

"U.S. Appl. No. 11/021,788, Non Final Office Action dated Jan. 23, 2009", 11 pgs.

"U.S. Appl. No. 11/021,788, Non Final Office Action dated Mar. 30, 2017", 15 pgs.

"U.S. Appl. No. 11/021,788, Non Final Office Action dated Apr. 29, 2016", 23 pgs.

(56) References Cited

OTHER PUBLICATIONS

"U.S. Appl. No. 11/021,788, Non Final Office Action dated Jun. 29, 2015", 14 pgs.
"U.S. Appl. No. 11/021,788, Non Final Office Action dated Aug. 6, 2014", 8 pgs.
"U.S. Appl. No. 11/021,788, Non Final Office Action dated Aug. 29, 2013", 16 pgs.
"U.S. Appl. No. 11/021,788, Non Final Office Action dated Sep. 24, 2007", 7 pgs.
"U.S. Appl. No. 11/021,788, Non Final Office Action dated Dec. 16, 2013", 10 pgs.
"U.S. Appl. No. 11/021,788, Notice of Non-Complaint Appeal Brief dated Sep. 3, 2009", 2 pgs.
"U.S. Appl. No. 11/021,788, Pre-Appeal Brief Request filed Jul. 14, 2014", 5 pgs.
"U.S. Appl. No. 11/021,788, Pre-Appeal Brief Request filed Jul. 18, 2008", 5 pgs.
"U.S. Appl. No. 11/021,788, Response filed Jan. 11, 2017 to Final Office Action dated Sep. 28, 2016", 18 pgs.
"U.S. Appl. No. 11/021,788, Response filed Mar. 7, 2016 to Final Office Action dated Oct. 15, 2015", 20 pgs.
"U.S. Appl. No. 11/021,788, Response filed Mar. 17, 2014 to Non Final Office Action dated Dec. 16, 2013", 12 pgs.
"U.S. Appl. No. 11/021,788, Response filed Apr. 29, 2015 to Final Office Action dated Dec. 29, 2014", 19 pgs.
"U.S. Appl. No. 11/021,788, Response filed Jun. 18, 2008 to Final Office Action dated Apr. 18, 2008", 12 pgs.
"U.S. Appl. No. 11/021,788, Response filed Jul. 28, 2016 to Non Final Office Action dated Apr. 29, 2016", 16 pgs.
"U.S. Appl. No. 11/021,788, Response filed Aug. 10, 2011 to Non Final Office Action dated Apr. 17, 2011", 8 pgs.
"U.S. Appl. No. 11/021,788, Response filed Sep. 25, 2015 to Non Final Office Action dated Jun. 29, 2015", 14 pgs.
"U.S. Appl. No. 11/021,788, Response filed Nov. 27, 2013 to Non Final Office Action dated Aug. 29, 2013", 9 pgs.
"U.S. Appl. No. 11/021,788, Response filed Dec. 8, 2014 to Non Final Office Action dated Aug. 6, 2014", 13 pgs.
"U.S. Appl. No. 11/021,788, Response filed Dec. 26, 2007 to Non-Final Office Action dated Sep. 24, 2007", 11 pgs.
"U.S. Appl. No. 11/021,788, Supplemental Appeal Brief filed Oct. 5, 2009", 24 pgs.
"U.S. Appl. No. 11/513,926, Response filed Jul. 15, 2013 to Final Office Action dated Mar. 13, 2013", 13 pgs.
"U.S. Appl. No. 11/513,926, Advisory Action dated May 20, 2013", 3 pgs.
"U.S. Appl. No. 11/513,926, Amendment filed Jul. 10, 2014", 12 pgs.
"U.S. Appl. No. 11/513,926, Applicant Interview Summary filed Sep. 8, 2014", 1 pg.
"U.S. Appl. No. 11/513,926, Examiner Interview Summary dated Aug. 8, 2014", 3 pgs.
"U.S. Appl. No. 11/513,926, Examiner Interview Summary dated Aug. 13, 2014", 2 pgs.
"U.S. Appl. No. 11/513,926, Final Office Action dated Feb. 5, 2014", 27 pgs.
"U.S. Appl. No. 11/513,926, Final Office Action dated Mar. 13, 2013", 27 pgs.
"U.S. Appl. No. 11/513,926, Final Office Action dated Apr. 30, 2015", 27 pgs.
"U.S. Appl. No. 11/513,926, Final Office Action dated Sep. 16, 2010", 21 pgs.
"U.S. Appl. No. 11/513,926, Non Final Office Action dated Mar. 14, 2016", 29 pgs.
"U.S. Appl. No. 11/513,926, Final Office Action dated Oct. 27, 2016", 26 pgs.
"U.S. Appl. No. 11/513,926, Non Final Office Action dated Jun. 16, 2017", 28 pgs.
"U.S. Appl. No. 11/513,926, Response filed Apr. 6, 2017 to Final Office Action dated Oct. 27, 2016", 23 pgs.
"U.S. Appl. No. 11/513,926, Non Final Office Action dated Sep. 4, 2013", 25 pgs.
"U.S. Appl. No. 11/513,926, Non Final Office Action dated Oct. 14, 2014", 30 pgs.
"U.S. Appl. No. 11/513,926, Non-Final Office Action dated May 13, 2010", 24 pgs.
"U.S. Appl. No. 11/513,926, Response filed Jan. 14, 2015 to Non Final Office Action dated Oct. 14, 2014", 22 pgs.
"U.S. Appl. No. 11/513,926, Response filed May 13, 2013 to Final Office Action dated Mar. 13, 2013", 14 pgs.
"U.S. Appl. No. 11/513,926, Response filed Jul. 14, 2016 to Non Final Office Action dated Mar. 14, 2016", 25 pgs.
"U.S. Appl. No. 11/513,926, Response filed Aug. 5, 2014 Final Office Action dated Feb. 5, 2014", 17 pgs.
"U.S. Appl. No. 11/513,926, Response filed Aug. 13, 2010 to Non Final Office Action dated May 13, 2010", 14 pgs.
"U.S. Appl. No. 11/513,926, Response filed Sep. 30, 2015 to Final Office Action dated Apr. 30, 2015", 25 pgs.
"U.S. Appl. No. 11/513,926, Response filed Dec. 16, 2010 to Final Office Action dated Sep. 16, 2010", 15 pgs.
"U.S. Appl. No. 11/513,926; Response filed Jan. 6, 2014 to Non-Final Office Action dated Sep. 4, 2013", 14 pgs.
"U.S. Appl. No. 11/832, 788, Final Office Action dated Feb. 24, 2011", 14 pgs.
"U.S. Appl. No. 11/832,788, Examiner Interview Summary dated Jan. 22, 2015", 3 pgs.
"U.S. Appl. No. 11/832,788, Examiner Interview Summary dated Apr. 4, 2016", 3 pgs.
"U.S. Appl. No. 11/832,788, Examiner Interview Summary dated Jul. 20, 2015", 10 pgs.
"U.S. Appl. No. 11/832,788, Final Office Action dated Mar. 4, 2015", 9 pgs.
"U.S. Appl. No. 11/832,788, Final Office Action dated May 19, 2016", 11 pgs.
"U.S. Appl. No. 11/832,788, Final Office Action dated Nov. 2, 2015", 11 pgs.
"U.S. Appl. No. 11/832,788, Non Final Office Action dated Apr. 9. 2014", 11 pgs.
"U.S. Appl. No. 11/832,788, Non Final Office Action dated Jul. 27, 2010", 14 pgs.
"U.S. Appl. No. 11/832,788, Non Final Office Action dated Aug. 16, 2013", 12 pgs.
"U.S. Appl. No. 11/832,788, Non Final Office Action dated Sep. 17, 2014", 6 pgs.
"U.S. Appl. No. 11/832,788, Non Final Office Action dated Dec. 1, 2015", 12 pgs.
"U.S. Appl. No. 11/832,788, Response filed Jan. 19, 2015 to Non Final Office Action dated Sep. 17, 2014", 12 pgs.
"U.S. Appl. No. 11/832,788, Non Final Office Action dated Jul. 27, 2010", 15 pgs.
"U.S. Appl. No. 11/832,788, Non Final Office Action dated Dec. 9, 2016", 10 pgs.
"U.S. Appl. No. 11/832,788, Response filed Sep. 16, 2016 to Final Office Action dated May 19, 2016", 19 pgs.
"U.S. Appl. No. 11/832,788, Response filed Jun. 24, 2011 to Final Office Action dated Feb. 24, 2011", 13 pgs.
"U.S. Appl. No. 11/832,788, Response filed Jun. 30, 2014 to Non Final Office Action dated Apr. 9, 2014", 9 pgs.
"U.S. Appl. No. 11/832,788, Response filed Jul. 6, 2015 to Final Office Action dated Mar. 4, 2015", 14 pgs.
"U.S. Appl. No. 11/832,788, Response filed Nov. 29, 2010 to Non Final Office Action dated Jul. 27, 2010", 12 pgs.
"U.S. Appl. No. 11/832,788, Response filed Dec. 16, 2013 to Non Final Office Action dated Aug. 16, 2013", 12 pgs.
"U.S. Appl. No. 11/832,788, Response filed Mar. 30, 2016 to Non Final Office Action dated Dec. 1, 2015", 17 pgs.
Pinker, Edieal J, et al., "Managing Online Auctions Current Business and Research Issues", Management Science © 2003 Informs vol. 49, No. 11, (Nov. 2003), 1457-1484.

* cited by examiner

MULTIPLE FORMAT SEARCH RESULT SETS

CLAIM OF PRIORITY

This application is a continuation of U.S. patent application Ser. No. 11/021,788, filed Dec. 23, 2004, which is incorporated herein by reference in its entirety.

FIELD

The present disclosure generally relates to the technical field of special-purpose machines configured to include search applications, including computerized variants of such special-purpose machines and improvements to such variants, and to the technologies by which such special-purpose machines become improved compared to other special-purpose machines that are configured to include search applications. In particular, the present disclosure addresses search applications that provide multiple format search result sets.

BACKGROUND

Information items are often offered for sale, for example on a web site, during a designated period of time. The item may be offered for sale in an auction-format or may be offered for sale in a fixed-price-format. On many web sites, a large number of items remain unsold after the designated period of time. Some web-based platforms also enable items to remain offered for sale for an indefinite (or undefined) period of time. Again, large numbers of items often remain unsold after a period of time that may be unacceptably long to a seller. The reasons the items may remain are numerous: the seller may have listed the item with a high starting price or reserve price in an auction system; the item may not be a popular item; the item did not show up high enough in searches; the item was listed in the wrong category; or potential buyers were simply unavailable. Buyers may be unavailable during a short designated duration. Further, some buyers become disillusioned after being outbid several times by more expert bidders in the auction-format listings.

When the item does not sell within the designated period of time, the seller may or may not relist the item for another designated period of time. Relisting the item may cost the seller, and may discourage the seller from relisting.

In auction systems, in an attempt to address the above problem, sellers may be encouraged to start the listings at a very low price, for example $0.01. However, most sellers are reluctant to start at such a low price, as their product may sell for $0.01. The duration of auctions may also be increased so that as more buyers become available, the listing receives bids and finally gets sold. However, long auction durations are unpopular with buyers because that means the buyers have to wait longer to receive the items, and most bidding activity may often occur during the closing hours of an auction anyway.

Sellers, buyers, and operators of the web site may each benefit when the number of successful transactions is maximized.

SUMMARY

According to one embodiment, there is provided a method and system of offering an item for sale, including listing the item in a first section of an electronic system and listing the item in a second section of the electronic system. The first section may offer the item for sale from a time A to a time B, and the second section may offer the item for sale from the time B to a time C.

According to an additional embodiment, there is provided a method and system of offering an item for sale includes listing the item in a first section of an electronic system and listing the item in a second section of the electronic system. The first section may offer the item for sale via an auction process and a first fixed-price process, and the second section may offer the item for sale via a second fixed-price process.

Other features will be apparent from the accompanying drawings and from the detailed description that follows.

BRIEF DESCRIPTION OF THE DRAWINGS

Embodiments of the present invention are illustrated by way of example and not limitation in the figures of the accompanying drawings, in which like references indicate similar elements and in which.

DETAILED DESCRIPTION

A method and system to list an item, for sale in a first section of an electronic system and in a second section of the electronic system, are described. In an embodiment, the first section may offer the item for sale from a time A to a time B, and the second section may offer the item for sale from the time B to a time C. In an additional embodiment, the first section may offer the item for sale via an auction process and a first fixed-price process, and the second section may offer the item for sale via a second fixed-price process. In the following description, for purposes of explanation, numerous specific details are set forth in order to provide a thorough understanding of embodiments of the present invention. It will be evident, however, to one skilled in the art that the present invention may be practiced without these specific details.

Platform Architecture

Figure 1:
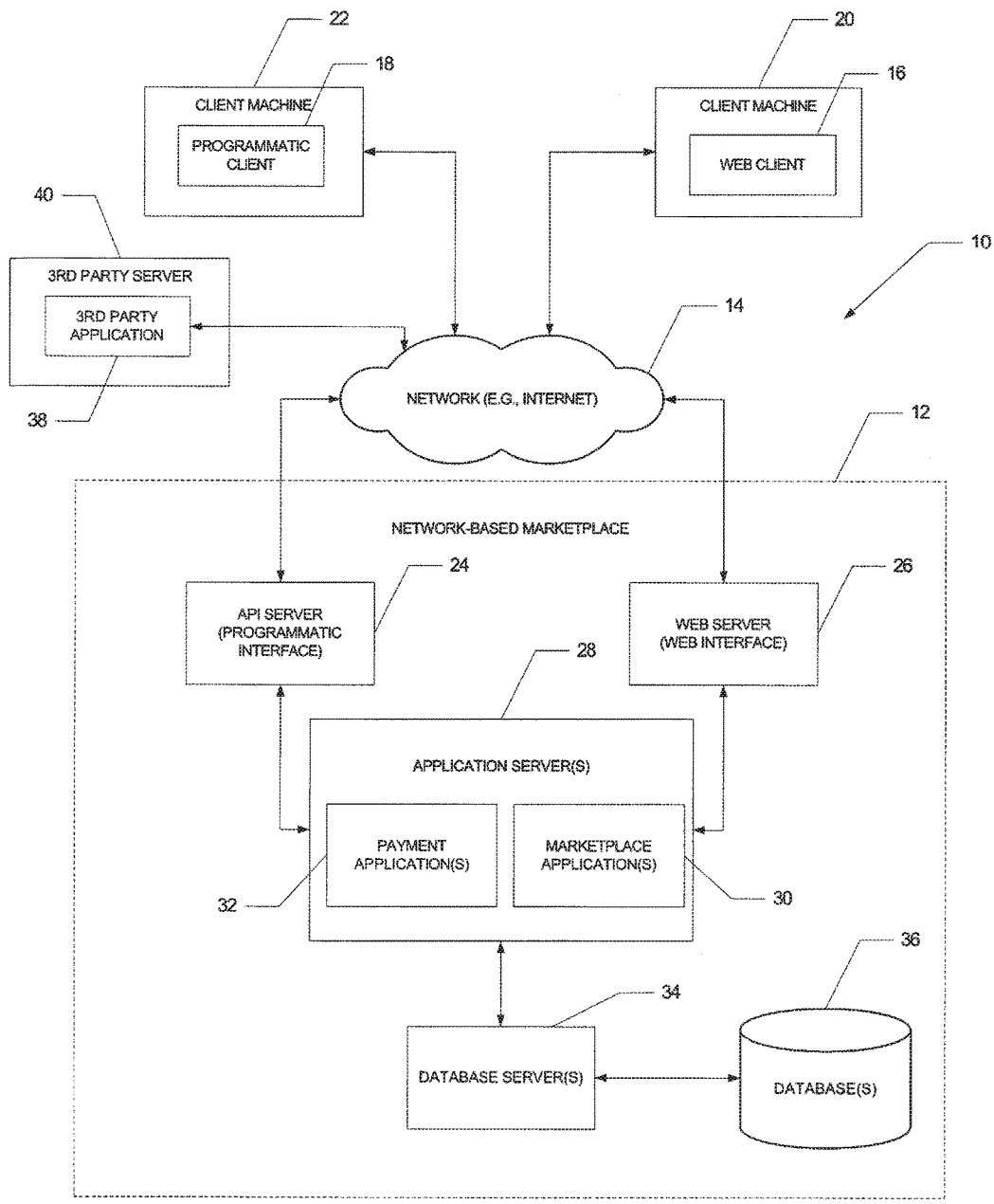
FIG. 1 illustrates a network diagram depicting a system, according to an example embodiment of the present invention, having a client-server architecture.

FIG. 1 illustrates a network diagram depicting a system 10 having a client-server architecture, according to an example embodiment of the present invention. A commerce platform, in the example form of a network-based marketplace 12, provides server-side functionality, via a network 14 (e.g., the Internet) to one or more clients. FIG. 1 illustrates, for example, a web client 16 (e.g., a browser, such as the Internet Explorer browser developed by Microsoft Corporation of Redmond, Wash. State), and a programmatic client 18 executing on respective client machines 20 and 22.

Turning specifically to the network-based marketplace 12, an Application Program Interface (API) server 24 and a web server 26 are coupled to, and provide programmatic and web interfaces respectively to, one or more application servers 28. The application servers 28 host one or more marketplace applications 30 and one or more payment applications 32. The application servers 28 are, in turn, shown to be coupled to one or more database servers 34 that facilitate access to one or more databases 36.

The marketplace applications 30 provide a number of marketplace functions and services to users that access the marketplace 12. The payment applications 32 likewise provide a number of payment services and functions to users. The payment applications 30 may allow users to quantify and accumulate value (e.g., in a commercial currency, such as the U.S. dollar, or a proprietary currency, such as "points") in accounts, and then later to redeem the accumulated value for products (e.g., goods or services) that are made available via the marketplace applications 30. While the marketplace and payment applications 30 and 32 are shown in FIG. 1 to both form part of the network-based marketplace 12, it will be appreciated that, in alternative embodiments of the present invention, the payment applications 32 may form part of a payment service that is separate and distinct from the marketplace 12.

Further, while the system 10 shown in FIG. 1 employs a client-server architecture, embodiments are of course not limited to such an architecture, and could equally well find applications in a distributed, or peer-to-peer, architecture system. The various marketplace and payment applications 30 and 32 could also be implemented as standalone software programs, which do not necessarily have networking capabilities.

The web client 16, it will be appreciated, accesses the various marketplace and payment applications 30 and 32 via the web interface supported by the web server 26. Similarly, the programmatic client 18 accesses the various services and functions provided by the marketplace and payment applications 30 and 32, respectively, via the programmatic interface provided by the API server 24. The programmatic client 18 may, for example, be a seller application (e.g., the TurboLister application developed by eBay Inc., of San Jose, Calif.) to enable sellers to author and manage listings on the marketplace 12 in an off-line manner, and to perform batch-mode communications between the programmatic client 18 and the network-based marketplace 12.

FIG. 1 also illustrates a third party application 38, executing on a third party server machine 40, as having programmatic access to the network-based marketplace 12 via the programmatic interface provided by the API server 24. For example, the third party application 38 may, utilizing information retrieved from the network-based marketplace 12, support one or more features or functions on a website hosted by the third party. The third party website may, for example, provide one or more promotional, marketplace or payment functions that are supported by the relevant applications of the network-based marketplace 12.

Marketplace Application(s)

Figure 2:
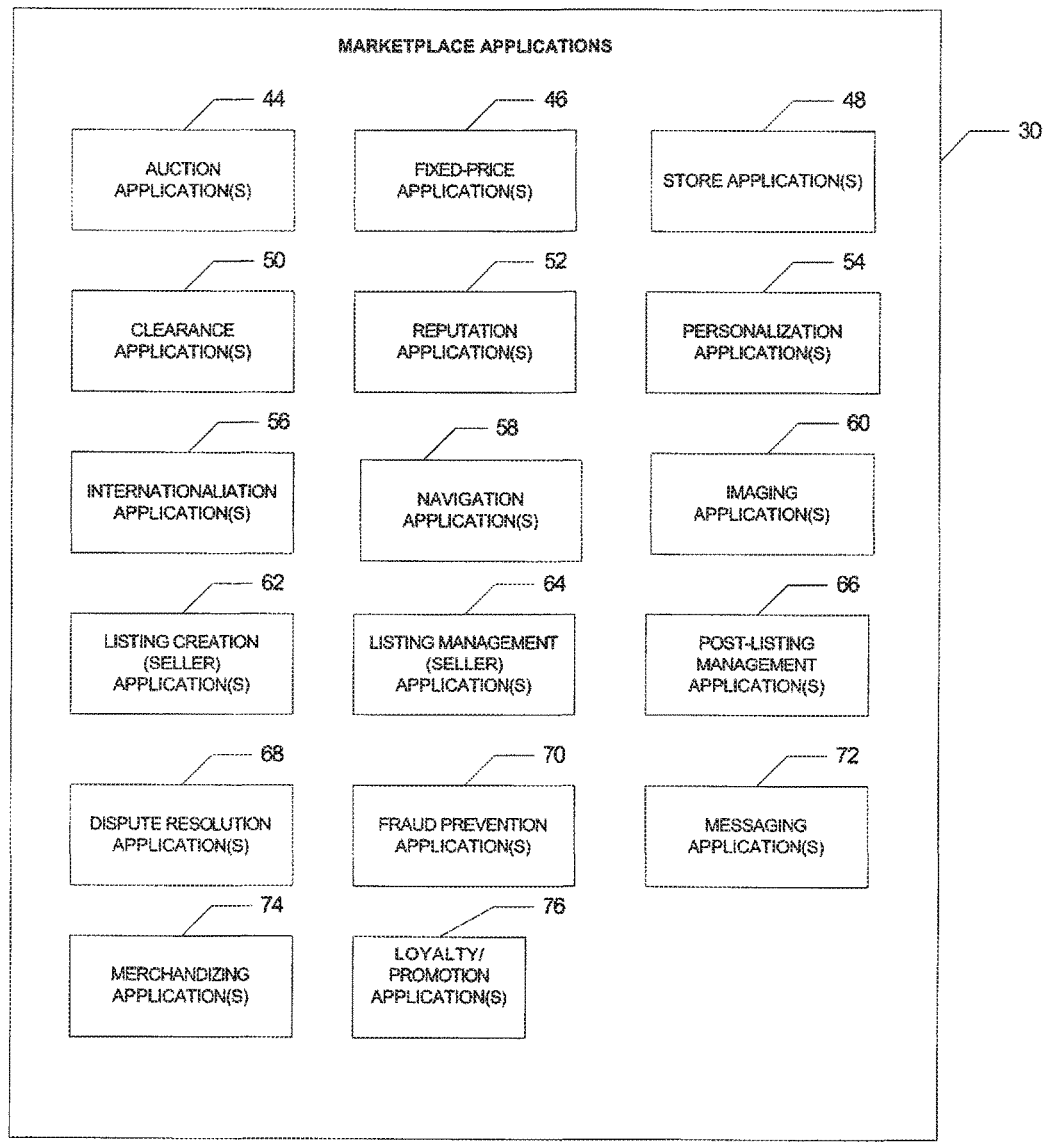
FIG. 2 illustrates a block diagram showing multiple marketplace applications that, in an example embodiment of the present invention, are provided as part of a network-based marketplace.

FIG. 2 illustrates a block diagram showing multiple marketplace applications 30 that, in an example embodiment of the present invention, may be provided as part of the network-based marketplace 12. The marketplace 12 may provide a number of listing and price-setting mechanisms whereby a seller may list goods or services for sale, a buyer can express interest in or indicate a desire to purchase such goods or services, and a price can be set for a transaction pertaining to the goods or services.

The marketplace applications 30 may include one or more auction applications 44 which support auction-format listing and price setting mechanisms (e.g., English, Dutch, Vickrey, Chinese, Double, Reverse auctions, etc.). The various auction applications 44 may also provide a number of features in support of such auction-format listings, such as a reserve price feature whereby a seller may specify a reserve price in connection with a listing and a proxy-bidding feature whereby a bidder may invoke automated proxy bidding.

The marketplace applications 30 may include one or more fixed-price applications 46. The fixed-price applications 46 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with an auction-format listing, and allow a buyer to purchase goods or services, which are also being offered for sale via an auction, for a fixed-price that may be higher than the starting price of the auction.

The marketplace applications 30 may include one or more store applications 48. The store applications 48 allow sellers to group their listings within a "virtual" store, which may be branded and otherwise personalized by and for the sellers. Such a virtual store may also offer promotions, incentives and features that are specific and personalized to a relevant seller. The virtual store may also offer items for sale listed in a clearance application 50 as described below.

The marketplace applications 30 may include one or more clearance applications 50 which support clearance-format listing in a clearance section of the publication/sales system and price setting mechanisms. The various clearance applications 50 may also provide a number of features in support of such clearance-format listings. The clearance applications 50 may support fixed-price listing formats (e.g., the traditional classified advertisement-type listing or a catalogue listing) and buyout-type listings. For example, the clearance item may be bought for a fixed price via instant online payment in the payment application(s) 32.

The items listed in a clearance section may be set at a fixed price by the seller, in a manner similar to the fixed-price applications 46 described above. The fixed price of the item in the clearance section may be reduced over time if the item remains unsold, as designated by the seller, for example. For example, the price of the item in clearance may be reduced by a designated percentage or amount after a designated number of days have passed. The price of the item in clearance may be reduced multiple times. The price may be reduced until the item is sold or the price of the item reaches a lower limit as defined by the seller, for example. For items that are transferred from the auction section, the fixed price may be less than at least one of the auction listing price and the auction reserve price. The fixed price may be less than the fixed price of the fixed-price application(s) 46, if any. The items listed in the clearance section may be offered for sale for an extended duration, as defined by the seller for example.

In contrast with the fixed-price applications 46, the clearance applications 50 are not generally offered in conjunction with an auction-format listing. The clearance applications 50 allow a buyer to purchase goods or services for a fixed-price that may be priced at or below market value.

The marketplace applications 30 may include one or more reputation applications 52. The reputation applications 52 allow parties that transact utilizing the network-based marketplace 12 to establish, build, and maintain reputations, which may be made available and published to potential trading partners. Consider that where, for example, the network-based marketplace 12 supports person-to-person trading, users may have no history or other reference information whereby the trustworthiness and credibility of potential trading partners may be assessed. The reputation applications 52 allow a user, for example through feedback provided by other transaction partners, to establish a reputation within the network-based marketplace 12 over time. Other potential trading partners may then reference such a reputation for the purposes of assessing credibility and trustworthiness.

The marketplace applications 30 may include one or more personalization applications 54. The personalization applications 54 allow users of the marketplace 12 to personalize various aspects of their interactions with the marketplace 12. For example a user may, utilizing an appropriate personalization application 54, create a personalized reference page at which information regarding transactions to which the user is (or has been) a party may be viewed. Further, a personalization application 54 may enable a user to personalize listings and other aspects of their interactions with the marketplace 12 and other parties.

In one embodiment, the network-based marketplace 12 may support a number of marketplaces that are customized, for example, for specific geographic regions. A version of the marketplace 12 may be customized for the United Kingdom, whereas another version of the marketplace 12 may be customized for the United States. Each of these versions may operate as an independent marketplace, or may be customized (or internationalized) presentations of a common underlying marketplace.

Navigation of the network-based marketplace 12 may be facilitated by one or more navigation applications 58. For example, a search application enables key word searches of listings published via the marketplace 12. A browse application allows users to browse various category, catalogue, or inventory data structures according to which listings may be classified within the marketplace 12. Various other navigation applications may be provided to supplement the search and browsing applications.

In order to make listings, available via the network-based marketplace 12, as visually informing and attractive as possible, the marketplace applications 30 may include one or more imaging applications 60. Users may upload images for inclusion within listings. An imaging application 60 also operates to incorporate images within viewed listings. The imaging applications 60 may also support one or more promotional features, such as image galleries that are presented to potential buyers. For example, sellers may pay an additional fee to have an image included within a gallery of images for promoted items.

The marketplace applications 30 may include one or more listing creation applications 62. The listing creation applications 62 allow sellers conveniently to author listings pertaining to goods or services that they wish to transact via the marketplace 12. Listing management applications 64 allow sellers to manage such goods or services listings. Specifically, where a particular seller has authored and/or published a large number of listings, the management of such listings may present a challenge. The listing management applications 64 provide a number of features (e.g., auto-relisting, inventory level monitors, etc.) to assist the seller in managing such listings. One or more post-listing management applications 66 also assist sellers with a number of activities that typically occur post-listing. For example, upon completion of an auction facilitated by one or more auction applications 44, a seller may wish to leave feedback regarding a particular buyer. To this end, a post-listing management application 66 may provide an interface to one or more reputation applications 52, so as to allow the seller conveniently to provide feedback regarding multiple buyers to the reputation applications 52. As another example, upon completion of an auction where the goods or services has not sold, the information item may automatically be relisted in the auction application(s) 44 and/or the fixed-price application(s) 46, or the information item may be automatically listed in the clearance application(s) 50, as discussed in more detail below.

The marketplace applications 30 may include dispute resolution applications 68. The dispute resolution applications 68 provide mechanisms whereby disputes arising between transacting parties may be resolved. For example, the dispute resolution applications 68 may provide guided procedures whereby the parties are guided through a number of steps in an attempt to settle a dispute. In the event that the dispute cannot be settled via the guided procedures, the dispute may be escalated to a third party mediator or arbitrator.

The marketplace applications 30 may include fraud prevention applications 70. A number of fraud prevention applications 70 implement various fraud detection and prevention mechanisms to reduce the occurrence of fraud within the marketplace 12.

The marketplace applications 30 may include messaging applications 72. The messaging applications 72 are responsible for the generation and delivery of messages to users of the network-based marketplace 12. Such messages, for example, advise users regarding the status of listings at the marketplace 12 (e.g., providing "outbid" notices to bidders during an auction process or to provide promotional and merchandising information to users).

The marketplace applications 30 may include merchandising applications 74. The merchandising applications 74 support various merchandising functions that are made available to sellers to enable sellers to increase sales via the marketplace 12. The merchandising applications 80 also operate the various merchandising features that may be invoked by sellers, and may monitor and track the success of merchandising strategies employed by sellers.

The network-based marketplace 12 itself, or one or more parties that transact via the marketplace 12, may operate loyalty programs that are supported by one or more loyalty/promotions applications 76. For example, a buyer may earn loyalty or promotions points for each transaction established and/or concluded with a particular seller, and may be offered a reward for which accumulated loyalty points can be redeemed.

Data Structures

Figure 3:
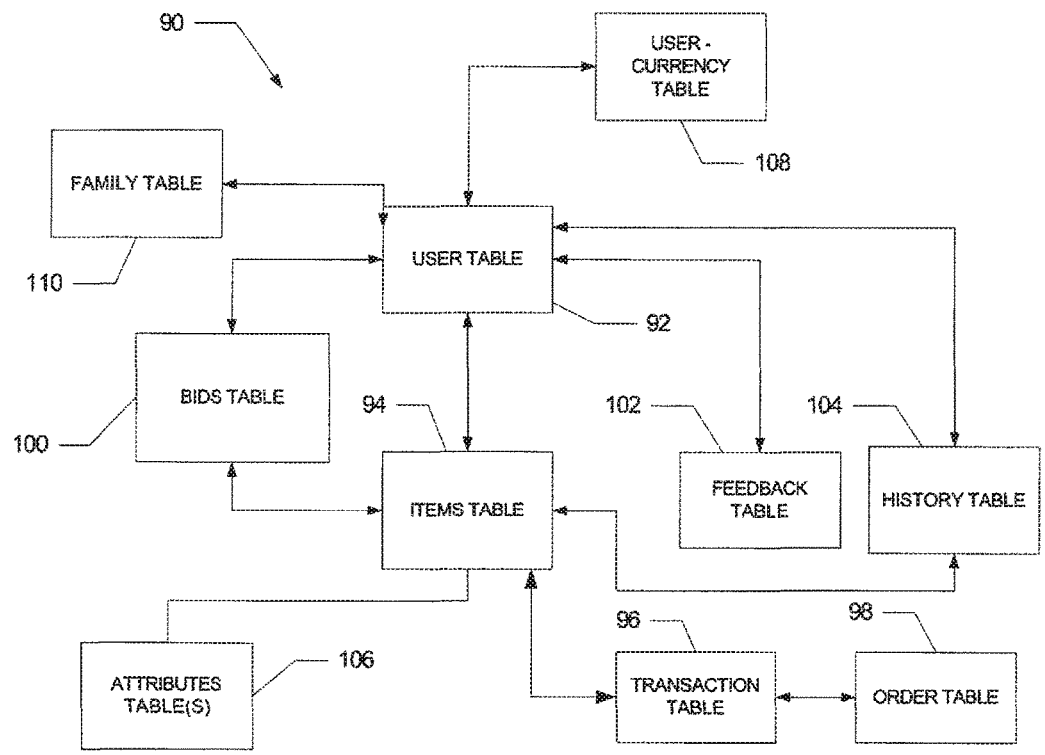
FIG. 3 illustrates a high-level entity-relationship diagram, illustrating various tables that may be maintained within databases, and that are utilized by and support the marketplace and payment applications, according to an example embodiment.

FIG. 3 illustrates a high-level entity-relationship diagram, illustrating various tables 90 that may be maintained within the databases 36, and that are utilized by and support the marketplace and payment applications 30 and 32.

The tables 90 may include a user table 92. The user table 92 contains a record for each registered user of the network-based marketplace 12, and may include identifier, address and financial instrument information pertaining to each such registered user. A user may, it will be appreciated, operate as a seller, a buyer, or both, within the network-based marketplace 12. In an example embodiment of the present invention, a buyer may be a user that has accumulated value (e.g., commercial or proprietary currency), and is then able to exchange the accumulated value for items that are offered for sale by the network-based marketplace 12.

The tables 90 may also include an items table 94 in which are maintained item records for goods and services that are available to be, or have been, transacted via the marketplace 12. Each item record within the items table 94 may furthermore be linked to one or more user records within the user table 92, so as to associate a seller and one or more actual or potential buyers with each item record.

The tables 90 may include a transaction table 96. The transaction table 96 contains a record for each transaction (e.g., a purchase transaction) pertaining to items for which records exist within the items table 94.

The tables 90 may include an order table 98. The order table 98 is populated with order records, each order record being associated with an order. Each order, in turn, may be with respect to one or more transactions for which records exist within the transactions table 96.

The tables 90 may include a bids table 100. Bid records within the bids table 100 each relate to a bid received at the network-based marketplace 12 in connection with an auction-format listing supported by the auction application(s) 44.

The tables 90 may include a feedback table 102. The feedback table 102 is utilized by one or more reputation applications 52, in an example embodiment, to construct and maintain reputation information concerning users.

The tables 90 may include a history table 104. The history table 104 maintains a history of transactions to which a user has been a party.

The tables 90 may include one or more attributes tables 106. The attributes tables 106 record attribute information pertaining to items for which records exist within the items table 94. Considering a single example of such an attribute, the attributes tables 106 may indicate a currency attribute associated with a particular item. The currency attribute may identify the currency of a price for the relevant item as specified by a seller.

Flowcharts

Figure 4:
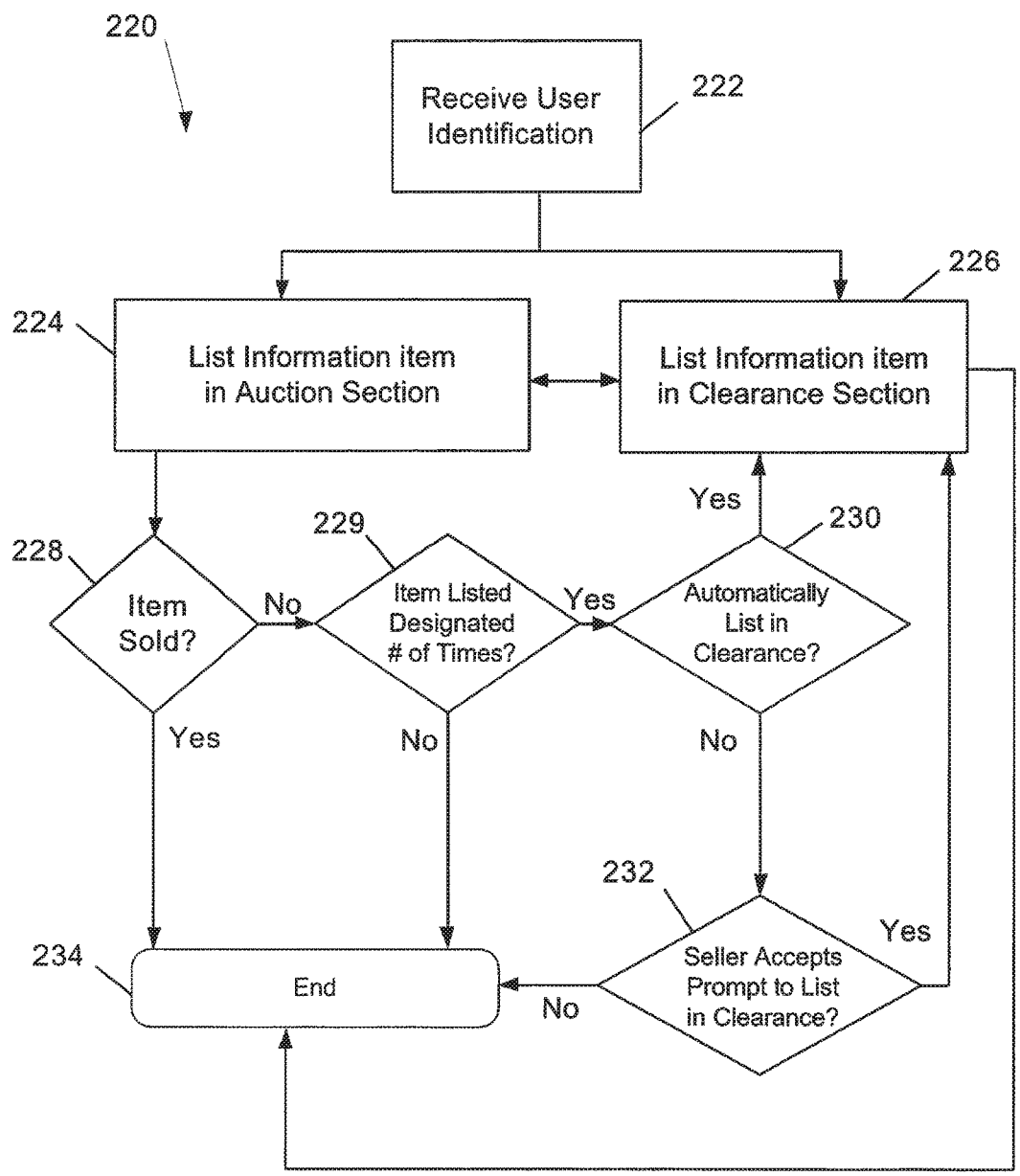
FIG. 4 illustrates a flow chart of a method, according to an example embodiment of the present invention, to list an information item (e.g., a sale listing) that may be published via a publication and/or sales system, such as a network-based marketplace or an electronic commerce system.

FIG. 4 illustrates a flow chart of a method 220, according to an example embodiment of the present invention, to list an information item (or a plurality of information items) that may be published via the publication and/or sales system, such as the network-based marketplace or the electronic commerce system.

The method 220 may assume that the identity of a user is known to the system. A user may have a logged into a website (e.g., using a username/password pair) operated by the publication and/or sales system (e.g., the marketplace 12). Alternatively, the identity of the user may be determined by some other mechanism, such as by a cookie deposit from the publication and/or sales system.

At block 222, user identification of a specific information item is received at the publication/sales system from the user, via the network. For example, the user may have listed an information item for sale in the system. This identification may comprise, for example, a user uploading information regarding the item and/or creating a webpage dedicated primarily to the information item of interest in association with the listing creating application(s) 62.

The method 220 may branch from block 222 to block 224. At block 224, the user may list the information item (or plurality of information items) in a first section, such as a general or active section (e.g. an auction section) of the publication and/or sales system. The first section may include the auction application(s) 44, and the fixed-price application(s) 46, and/or the store application(s) 48, for example.

The first section may offer information items for sale during at most a predetermined amount of time. For example, an auction for the item may last for 7 days, and the item may go to the highest bidder, assuming a reserve price, if any, is met. As another example, the auction may be set from a time A to a time B, and may have a fixed-price option of the fixed-price application 46 associated with the auction. A buyer may buy the item at that fixed-price before the time B. When a buyer buys the item successfully, the method 220 moves to the end block 234 (discussed more with regard to query 228).

The method 220 may also branch from block 222 to block 226. At block 226, the user may list the information item in a second section of the publication and/or sales system. The second section may include a fixed-price section (e.g. the clearance application(s) 50 and/or the store application(s) 48, for example). The second section of the electronic publishing system may offer information items for sale at a fixed price, often at a reduced price. The item may be listed in the clearance section, for example, even when the item has not been previously offered for sale in the auction section, for example. After the item is listed in the clearance section at a determined price and for a determined length of time, the method ends at block 234 and may move on to the payment application(s) 32, for example, if the item is sold.

In an optional embodiment, a seller may transfer the item from the clearance section at block 226 to the auction section at block 224. Reciprocally, a seller may transfer the item from the auction section at block 224 directly to the clearance section at block 226. A fee may be associated with one or both of these transfers.

As the first section (e.g. the auction section) may offer the item for sale from the time A to the time B, the second section (e.g. the clearance section) may offer the item for sale from the time B to a time C. At the time B, the item may transfer from the first section to the second section. The time A, the time B, the time C, and the direction of the transfer may be seller-defined.

From block 224, the method 220 may be queried at block 228 as to whether the information item was sold in the auction section at block 224. If the answer to the query is yes, the method 220 proceeds to the end block 234 and may move on to the payment application(s) 32, for example.

If the answer to the query at block 228 is no, the method 220 may be queried at block 229 as to whether the item has been listed in the auction section a designated number of times. If the answer to the query at block 229 is no, the method 220 may end at block 234. If the answer to the query at block 229 is yes, the method may proceed to block 230.

Alternatively or additionally, if the answer to the query at block 229 is no, the method 220 may proceed to re-list the item in the auction section at block 224. In the listing management application(s) 64, the user may have selected the option to automatically re-list in the auction section or may have selected the option to re-list upon prompting from the system, such as from clicking on a link received in an electronic mail communication, in example embodiments. The user may also select the designated number of times to re-list in the auction section before the item is moved to the clearance section, or before the user is prompted to move the item to the clearance section, or before the method proceeds to the end block 234. After the method proceeds to the end block 234, the user may re-list the item in the auction and/or clearance sections.

At block 230, the method 220 may be queried as to whether the user has selected an option to automatically list the information item (or plurality of information items) in the clearance section. For example, the user or seller may have selected an option in the listing management application(s) 64 to automatically list the item in the clearance section. The option may be contingent upon meeting a designated condition. The designated condition may include a designated number of times the item is listed in the auction section at block 229, an end of an auction wherein the item is unsold, and/or receipt of a seller input instructing the transition or transfer of the item between the auction and clearance sections. The seller may be responding to a prompting email, for instance.

If the answer to the query at block 230 is yes (e.g., the user has selected an option to automatically list the information item in the clearance section), then the item is listed in the clearance section of the publications/sales system at block 226. There may or may not be a fee associated with listing the item in the clearance section of the system after the item has been listed a certain number of times in the auction section. In an example embodiment, there is a fee associated with listing the item in the clearance section when the item is listed (unsuccessfully) less than two times in the auction section of the system. In another example embodiment, the fee associated with listing the item in the clearance section may be waived after the item is listed (unsuccessfully) at least two times in the auction section of the system. A first fee associated with offering the item for sale in the auction section may be assessed. A second fee associated with offering the item for sale in the clearance section may be assessed. The second fee may be waived when the first fee is assessed.

If the answer to the query at block 230 is no (e.g. the user has not selected an option to automatically list the information item in the clearance section), the method 220 then moves to block 232. At block 232 a communication, such as through electronic mail or another prompt, is made with the user (e.g. the seller) to query the user as to whether the user accepts listing the item in the clearance application(s). If the answer to the query is yes, the method 220 moves to block 226, listing the item in the clearance section of the publication/sales system. If the answer to the query at block 232 is no, the method ends at block 234.

Figure 5:
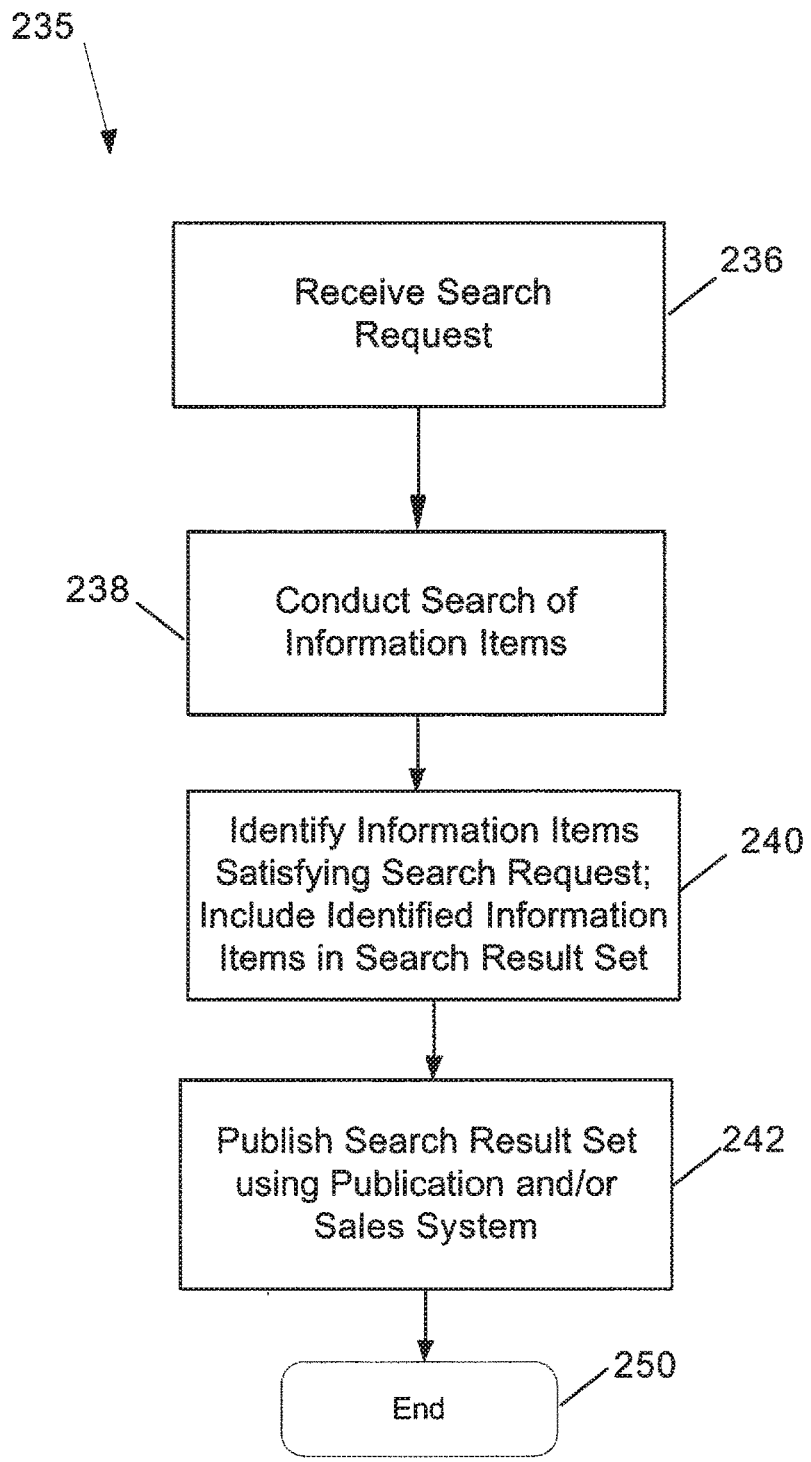
FIG. 5 illustrates a flow chart of a method, according to an example embodiment of the present invention, to conduct a search of information items according to certain criteria and to publish a search result set of a publication and/or sales system, such as a network-based marketplace or an electronic commerce system.

FIG. 5 illustrates a flow chart of a method 235, according to an example embodiment of the present invention, to conduct a search of information items according to certain criteria and to publish a search result set of a publication and/or sales system, such as network-based marketplace or an electronic commerce system.

The method 235 may begin at block 236, where the publication and/or sales system receives a search request. For example, the search request may be received from the user. Further, the search request may include filter criteria such as status criteria (e.g., auction items and/or clearance items), category criteria (e.g., sales listings within a particular product or service category), website criteria (e.g., sales listings published via a country specific website operated by the publication and/or sales system), price criteria (e.g., sales listings for which the current price is below a predetermined value), or any one of a number of other criteria.

At block 238, the publication and/or sales system conducts a search of information items by applying the filter criteria to information items stored in the publication and/or sales system.

Figure 6:
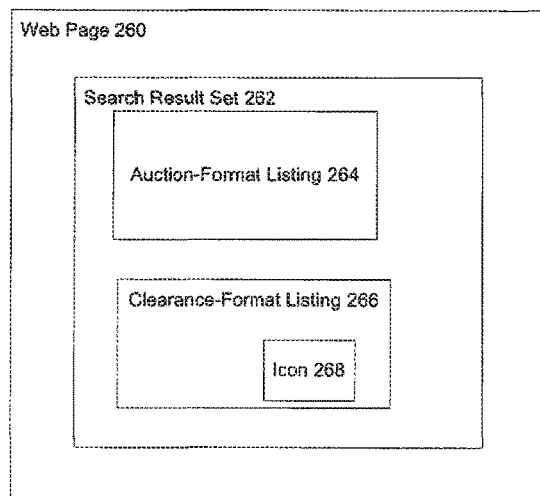
FIG. 6 illustrates a web page including a search result set of a publication and/or sales system, such as a network-based marketplace or an electronic commerce system, according to an example embodiment.

At block 240, information items that satisfy the search request are identified, and included in a search result set that is then published, via the publication and/or sales system, at block 242. In an example, information items of a particular status (e.g., auction and/or clearance), published within certain time constraints (e.g., published in the last 24 hours), published within certain product or service categories, or including certain description information (e.g. meeting a certain price criteria) may be included within the search result set. An example search result set is illustrated in FIG. 6. Taking a commerce website as an example, a user may have "clicked through" a hypertext link presented in a list of search results, to be presented with a webpage providing a detailed sale listing pertaining to it, as may have been created in the listing creation application(s) 62.

The method then ends at block 250.

User Interface

FIG. 6 illustrates a web page 260 including a search result set 262 of a publication and/or sales system, such as network-based marketplace or an electronic commerce system, according to an example embodiment. The search result set 262 constitutes an example of a list of information items in auction-format listing 264 supported by the auction application(s) and/or clearance-format listing 266 supported by the clearance application(s), which may be published by the publication and/or sales system in response to the search request of FIG. 5. The clearance-format listing 266 may be distinguished from the auction-format listing 264 when both are listed in the search result set 262. For example, the clearance-format listing 266 may include a clearance icon 268 associated with each information item of the information items listed in the clearance section. As an additional example, items in the auction-format listing 264 may be separate from items in the clearance-format listing 266.

Figure 7:
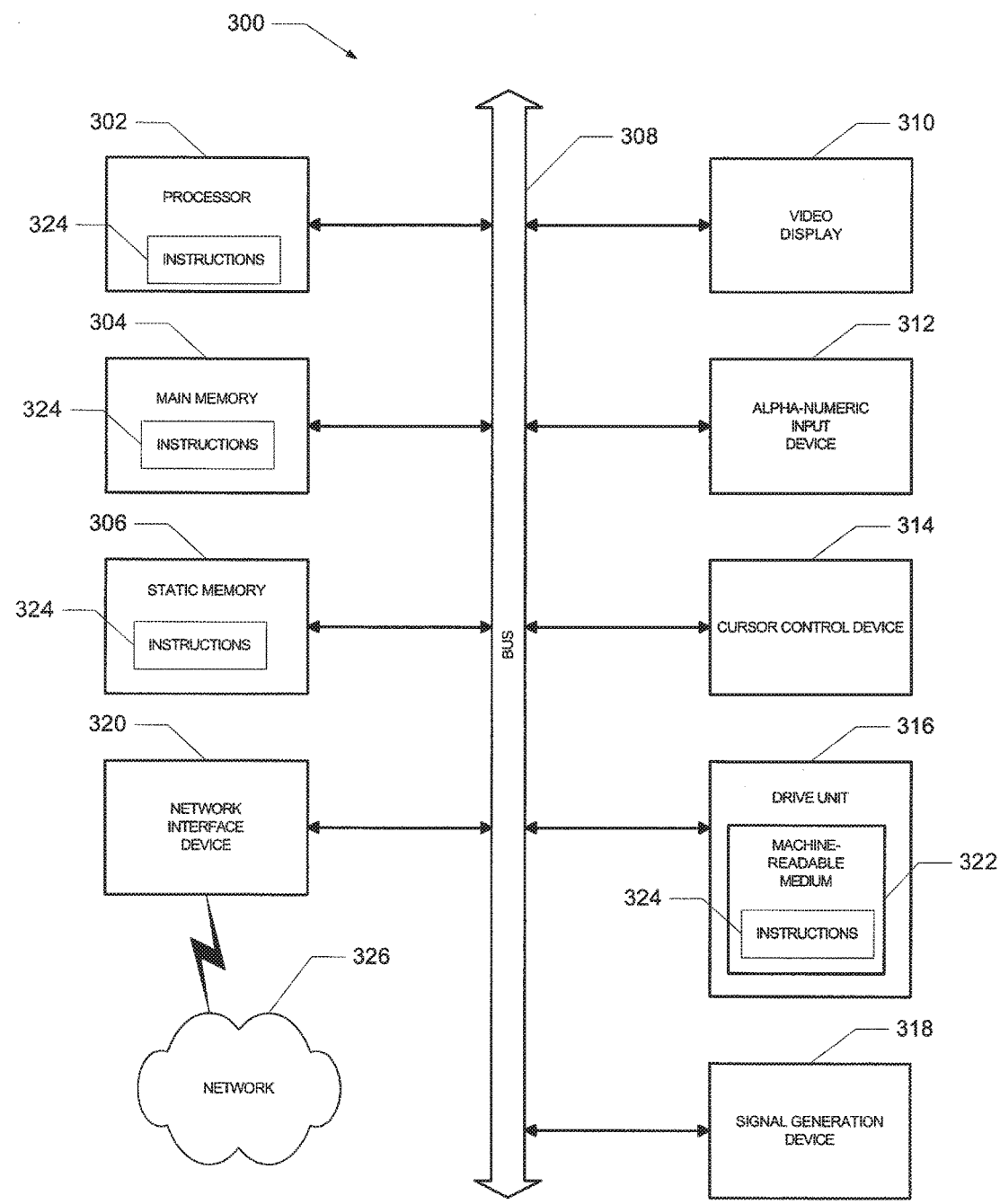
FIG. 7 shows a diagrammatic representation of a machine in the form of a computer system within which a set of instructions, for causing the machine to perform any one or more of the methodologies discussed herein, may be executed, according to an example embodiment.

FIG. 7 shows a diagrammatic representation of a machine in the example form of a computer system 300 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 300 includes a processor 302 (e.g., a central processing unit (CPU), a graphics processing unit (GPU), or both), a main memory 304 and a static memory 306, which communicate with each other via a bus 308. The computer system 300 may further include a video display unit 310 (e.g., a liquid crystal display (LCD) or a cathode ray tube (CRT)). The computer system 300 also includes an input device 312 (e.g., a keyboard), a cursor control device 314 (e.g., a mouse), a disk drive unit 316, a signal generation device 318 (e.g., a speaker) and a network interface device 320.

The disk drive unit 316 includes a machine-readable medium 322 on which is stored one or more sets of instructions (e.g., software 324) embodying any one or more of the methodologies or functions described herein. The instructions 324 may also reside, completely or at least partially, within the main memory 304, the static memory 306, and/or within the processor 302 during execution thereof by the computer system 300. The main memory 304 and the processor 302 also may constitute machine-readable media.

The instructions 324 may further be transmitted or received over a network 326 via the network interface device 320.

Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

While the machine-readable medium 322 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. FIGS. 1 to 7 are merely representational and may not be drawn to scale. Certain proportions thereof may be exaggerated, while others may be minimized. Accordingly, the specification and drawings are to be regarded in an illustrative rather than a restrictive sense.

The following description includes terms, such as "up", "down", "upper", "lower", "first", "second", etc. that are used for descriptive purposes only and are not to be construed as limiting. The elements, materials, geometries, dimensions, and sequence of operations may all be varied to suit particular applications. Parts of some embodiments may be included in, or substituted for, those of other embodiments. While the foregoing examples of dimensions and ranges are considered typical, the various embodiments are not limited to such dimensions or ranges.

The Abstract is provided to comply with 37 C.F.R. § 1.74(b) to allow the reader to quickly ascertain the nature and gist of the technical disclosure. The Abstract is submitted with the understanding that it will not be used to interpret or limit the scope or meaning of the claims.

In the foregoing Detailed Description, various features are grouped together in a single embodiment for the purpose of streamlining the disclosure. This method of disclosure is not to be interpreted as reflecting an intention that the claimed embodiments have more features than are expressly recited in each claim. Thus the following claims are hereby incorporated into the Detailed Description, with each claim standing on its own as a separate embodiment.

Thus, a method and system to list an item in a fixed-price section have been described. Although embodiments of the present invention have been described with reference to specific example embodiments, it will be evident that various modifications and changes may be made to these embodiments without departing from the broader spirit and scope of embodiments as expressed in the subjoined claims.

What is claimed is:

1. A method comprising:
   receiving, from a first client device, an item listing describing a physical item, the item listing specifying a first time period and a second time period after the first time period;
   publishing, via a first application executed by one or more processors of a machine, the item listing on a website in a auction webpage format, the first application configured to update, in a table, numerical value data input from a plurality of users, the first application further configured to receive updates to the numerical value data through the item listing published using the auction webpage format;
   in response to determining that the first time period has ended, automatically publishing, via a second application executed by the one or more processors, the item listing on the website in a fixed webpage format, the second application configured to maintain the numerical value data at a fixed numerical value for the second time period;
   receiving, via the website, from a second client device, a search request for the physical item described in the item listing, the search request received from the second client device during the second time period while the item listing is on the website in the fixed webpage format; and
   in response to the search request, providing, by the one or more processors, to the second client device a user interface comprising an auction search results window that displays a first set of one or more item listings published in the auction webpage format and a fixed search results window that displays a second set of one or more item listings published in the fixed webpage format, wherein the fixed search results window includes the item listing in the fixed webpage format.

2. The method of claim 1, wherein the first time period comprises a first time span and a second time span.

3. The method of claim 2, further comprising:
   in response to determining that the first time span has ended, automatically publishing, via the first application, the item listing for the second time span using the auction webpage format, wherein the first time period ends when the second time span ends.

4. The method of claim 1, further comprising:
prompting a user of the first client device to approve automatically publishing the item listing in the fixed webpage format upon expiry of the first time period.

5. The method of claim 1, wherein the auction search results window and the fixed search results window are simultaneously displayed in the user interface of the second client device.

6. The method of claim 5, wherein the fixed search results window displays an indication that the second set of one or more item listings are in the fixed webpage format.

7. The method of claim 6, wherein the indication is an icon.

8. The method of claim 7, wherein each item listing of the second set of one or more item listings displays the icon.

9. The method of claim 6, wherein the first set of one or more item listings in the auction search results window are separate from the second set of one or more item listings in the fixed search results window.

10. The method of claim 9, wherein the indication is an icon displayed within the fixed search results window of the user interface.

11. A system comprising:
one or more processors of a machine; and
a memory storing instructions that, when executed by the one or more processors, cause the machine to perform operations comprising:
receiving, from a first client device, an item listing describing a physical item, the item listing specifying a first time period and a second time period;
publishing, via a first application, the item listing on a website in a auction webpage format, the first application configured to update, in a table, numerical value data input from a plurality of users, the first application further configured to receive updates to the numerical value data through the item listing published using the auction webpage format;
in response to determining that the first time period has ended, automatically publishing, via a second application executed by the one or more processors, the item listing on the website in a fixed webpage format, the second application configured to maintain the numerical value data at a fixed numerical value for the second time period;
receiving, via the website, from a second client device, a search request for the physical item described in the item listing, the search request received from the second client device during the second time period while the item listing is on the website in the fixed webpage format; and
in response to the search request, providing, by the one or more processors, to the second client device a user interface comprising an auction search results window that displays a first set of one or more item listings published in the auction webpage format and a fixed search results window that displays a second set of one or more item listings published in the fixed webpage format, wherein the fixed search results window includes the item listing in the fixed webpage format.

12. The system of claim 11, wherein the first time period comprises a first time span and a second time span.

13. The system of claim 12, the operations further comprising:
in response to determining that the first time span has ended, automatically publishing, via the first application, the item listing for the second time span using the auction webpage format, wherein the first time period ends when the second time span ends.

14. The system of claim 11, the operations further comprising:
prompting a user of the first client device to approve automatically publishing the item listing in the fixed webpage format upon expiry of the first time period.

15. The system of claim 11, wherein the auction search results window and the fixed search results window are simultaneously displayed in the user interface of the second client device.

16. The system of claim 15, wherein the fixed search results window displays an indication that the second set one or more item listings are in the fixed webpage format.

17. The system of claim 16, wherein the indication is an icon.

18. The system of claim 17, wherein each item listing of the second set of one or more item listings displays the icon.

19. The system of claim 16, wherein the first set of one or more item listings in the auction search results window are separate from the second set of one or more item listings in the fixed search results window, and wherein the indication is an icon displayed within the fixed search results window of the user interface.

20. A non-transitory machine-readable storage device embodying instructions that, when executed by one or more processors of a machine, cause the machine to perform operations comprising:
receiving, from a first client device, an item listing describing a physical item, the item listing specifying a first time period and a second time period after the first time period;
publishing, via a first application, the item listing on a website in a auction webpage format, the first application configured to update, in a table, numerical value data input from a plurality of users, the first application further configured to receive updates to the numerical value data through the item listing published using the auction webpage format;
in response to determining that the first time period has ended, automatically publishing, via a second application, the item listing on the website in a fixed webpage format, the second application configured to maintain the numerical value data at a fixed numerical value for the second time period;
receiving, via the website, from a second client device, a search request for the physical item described in the item listing, the search request received from the second client device during the second time period while the item listing is on the website in the fixed webpage format; and
in response to the search request, providing to the second client device a user interface comprising an auction search results window that displays a first set of one or more item listings published in the auction webpage format and a fixed search results window that displays a second set of one or more item listings published in the fixed webpage format, wherein the fixed search results window includes the item listing in the fixed webpage format.

* * * * *

UNITED STATES PATENT AND TRADEMARK OFFICE
CERTIFICATE OF CORRECTION

PATENT NO. : 10,430,853 B2
APPLICATION NO. : 15/582140
DATED : October 1, 2019
INVENTOR(S) : Amit Goel Page 1 of 1

It is certified that error appears in the above-identified patent and that said Letters Patent is hereby corrected as shown below:

In the Claims

In Column 14, Line 15, in Claim 16, delete "set" and insert -- set of --, therefor.

Signed and Sealed this
Twenty-seventh Day of October, 2020

Andrei Iancu
*Director of the United States Patent and Trademark Office*